(12) United States Patent
Ohara

(10) Patent No.: US 7,395,325 B2
(45) Date of Patent: Jul. 1, 2008

(54) NETWORK MANAGEMENT SYSTEM, APPARATUS TO BE MANAGED, MANAGEMENT APPARATUS AND PROGRAM

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 857 days.

(21) Appl. No.: 10/388,660

(22) Filed: Mar. 17, 2003

(65) Prior Publication Data

US 2004/0039808 A1 Feb. 26, 2004

(30) Foreign Application Priority Data

Mar. 22, 2002 (JP) ............................. 2002-080857

(51) Int. Cl.
*G06F 15/173* (2006.01)
*G06F 15/177* (2006.01)
*G06F 15/16* (2006.01)
*G06F 7/00* (2006.01)

(52) U.S. Cl. ............... 709/223; 709/220; 709/203; 709/227; 707/101; 707/102

(58) Field of Classification Search ............... 709/223, 709/224, 236, 217, 220, 203; 707/101, 102
See application file for complete search history.

(56) References Cited

U.S. PATENT DOCUMENTS

| | | | |
|---|---|---|---|
| 5,442,749 A | | 8/1995 | Northcutt et al. |
| 5,572,678 A | | 11/1996 | Homma et al. |
| 5,634,009 A | * | 5/1997 | Iddon et al. ............... 709/223 |
| 5,798,738 A | | 8/1998 | Yamada |
| 5,913,037 A | * | 6/1999 | Spofford et al. ............. 709/226 |
| 6,104,499 A | | 8/2000 | Yamada |
| 6,122,639 A | * | 9/2000 | Babu et al. ............... 707/103 R |

(Continued)

FOREIGN PATENT DOCUMENTS

JP A 7-334436 12/1995

(Continued)

OTHER PUBLICATIONS

Berge et al., "Firewalls in an OSI-environment," Computer Communications vol. 19, No. 12, pp. 982-989, Oct. 1, 1996.

(Continued)

*Primary Examiner*—Ario Etienne
*Assistant Examiner*—Kevin Bates
(74) *Attorney, Agent, or Firm*—Oliff & Berridge, PLC

(57) ABSTRACT

A network management system which allows handling of data having a large data size without making changes to a management apparatus. In the system, the prefix is set to a value for identifying a table object containing image data, and the suffix is set to "0" (S110). A piece of data specified by the prefix and the suffix is obtained using a GET_NEXT command. If the prefix indicated by the received GETREPLY is identical with the prefix specified by the transmitted GET_NEXT command, the received data is added to image data being formed in a data combining portion. Then, the suffix indicated by the GETREPLY is set as the suffix of the GET_NEXT command to be transmitted next, and the same operation is repeatedly performed. On the other hand, if the two prefixes are different, the received data is discarded and the present process is terminated (S120-S160).

62 Claims, 8 Drawing Sheets

U.S. PATENT DOCUMENTS 7,039,010 B2 * 5/2006 Ni ............................. 370/229
2001/0037358 A1 * 11/2001 Clubb et al. ................ 709/203

FOREIGN PATENT DOCUMENTS

| | | |
|---|---|---|
| JP | A 8-292922 | 11/1996 |
| JP | A 8-329005 | 12/1996 |
| JP | A 9-224232 | 8/1997 |
| JP | A 10-23194 | 1/1998 |
| JP | A 10-327165 | 12/1998 |
| JP | A 11-53023 | 2/1999 |
| JP | A 11-275299 | 8/1999 |
| JP | A 11-296457 | 10/1999 |
| JP | A 2000-163122 | 6/2000 |
| JP | A 2000-172603 | 6/2000 |
| JP | A 2000-181826 | 6/2000 |
| JP | A 2000-194640 | 7/2000 |
| JP | A 2000-347976 | 12/2000 |
| JP | A 2002-23972 | 1/2002 |

OTHER PUBLICATIONS

Baldi et al., "Evaluating the Tradeoffs of Mobile Code Design Paradigms in Network Management Applications," Software Engineering, pp. 146-155, Apr. 19, 1998.

Oliveira et al., "Managing SNMP environments using Mobile SnmpSql," Systems Management, pp. 78-85, Apr. 22, 1998.

Rubinstein et al., "Using Mobile Agent Strategies for Reducing the Response Time in Network Management," IEEE vol. 1, pp. 278-281, Aug. 21, 2000.

* cited by examiner 1.3.6.1.4.1.2435.2.4.3.99.1 ←

2 ←

3 ←

4 ←

5 ←

NAME 1. 3. 6. 1. 4. 1. 2435. 2. 4. 3. 99. 1

PREFIX        SUFFIX (= 0 : SCALAR OBJECT)
(≠ 0 : TABLE OBJECT )

FIG. 3

MIB TREE DICTIONARY

| | |
|---|---|
| ↓ | 97.1 |
| ↓ | 97.2 |
| 1.3.6.1.4.1.2435.2.4.3. | 98.0 |
| ↑ | 99.1 |
| ↑ | 99.2 |
| ↑ | 99.3 |
| ↑ | 99.4 |
| ↑ | 99.5 |
| ↑ | 100.0 |

NETWORK MANAGEMENT SYSTEM, APPARATUS TO BE MANAGED, MANAGEMENT APPARATUS AND PROGRAM

BACKGROUND OF THE INVENTION (1) Field of the Invention

The present invention relates to a network management system in which a management apparatus collects management information stored by an apparatus to be managed, an apparatus to be managed for use in the network management system, a management apparatus and a program.

(2) Description of the Background Art

In a known network management system, network apparatuses (apparatuses to be managed) such as a printer, a scanner, a fax machine and an MFP (Multifunction Peripheral) are collectively monitored and controlled by a management apparatus provided separately from the apparatuses to be managed through a network using a Simple Network Management Protocol (SNMP).

FIG. 4 is a block diagram showing the software structure of a network management system constructed in the network using the UDP/IP.

In an apparatus to be managed TNi (i=1-4), as shown in FIG. 4, a Management Information Base (MIB) 111 comprising a group of objects 111a which are a group of management information (objects) about the apparatus to be managed TNi and a MIB tree dictionary 111b which is information for specifying the management information, a communication controller 113 for controlling communications in accordance with the UDP/IP protocol and an SNMP agent 112 which is a program for performing the process of reading and updating the information of the MIB 111 in accordance with a request message (i.e. GET command, GET_NEXT command, SET command) received from a management apparatus TC through the communication controller 113, and of transmitting a reply message (GETREPLY) to the management apparatus TC through the communication controller 113 are packaged.

In the management apparatus TC, on the other hand, an input portion 121 for inputting an instruction from an operator, a display portion 122 for displaying various kinds of information, a group of image data 123 which is a group of image data for use in displaying the outline view of the apparatus to be managed TNi on the display portion 122, a communication a controller 126 for controlling communications in accordance with UDP/IP protocol, an SNMP manager 125 which is a program for obtaining and setting management information using the SNMP agent 112 packaged in the apparatus to be managed TNi by transmitting/receiving the above mentioned request message and reply message (hereinafter collectively referred to as "SNMP messages") through the communication controller 126, and a controller 124 for performing, in accordance with the instruction input through the input portion 121, the process of, for instance, displaying the information obtained from the apparatus to be managed TNi using the SNMP manager 125 and the outline view of the apparatus to be managed TNi obtained from the group of image data 123 on the display portion 122 are packaged.

In a network management system 100 constructed as above, when the management apparatus TC is started, a list of the apparatuses to be managed TNi which are connected to the network is displayed on the display portion 122. When one of the apparatuses is selected in accordance with the instruction from the input portion 121, the indication on the display portion 122 is switched to a management screen with respect to the selected apparatus to be managed TNi, and then it becomes possible to confirm or change the operating state or the setting state of the apparatus to be managed TNi on the management screen.

FIG. 5 shows an example of the initial screen to be first displayed when the indication on the display is switched to the management screen. The initial screen is designed to indicate the capabilities W1 and the outline view W2 as well as the current operating state W3 and set values W4 of a variety of management information with respect to the apparatus to be managed TNi.

In this case, the outline view W2 is indicated by selecting and using the corresponding image data of the apparatus to be managed TNi from the group of image data 123 stored in the management apparatus TC. The rest of the data W1, W3 and W4 are indicated using the values obtained from the apparatus to be managed TNi by means of SNMP messages.

The reason that the image data concerning the outline view W2 is stored in the management apparatus TC is that since SNMP has a limitation to the maximum length (e.g. 255 bytes) of data that can be obtained by a single message, data of a large size exceeding the maximum length, such as the image data concerning the outline view W2, cannot be obtained by means of SNMP.

In the above described network management system 100, however, the management apparatus TC is required to have as many outline views as the number of the apparatuses to be managed TNi. Accordingly, the more the number of the apparatuses to be managed TNi becomes, the larger storage capacity must be secured for the group of image data 123. Moreover, if a new model apparatus to be managed TNi is connected to the network, the management apparatus TC, in which the corresponding outline view of the new model apparatus to be managed TNi has not yet been stored, cannot indicate the outline view. Therefore, every time a new model apparatus to be managed TNi is connected to the network, the group of image data 123 must be updated.

An object of the present invention is to make it possible to handle data of a large data size without making any changes to the management apparatus in order to solve the above described problems.

SUMMARY OF THE INVENTION

The above and other objects are achieved by a network management system according to the present invention. In the network management system, when data to be managed as management information has a data size larger than a maximum size of data able to be obtained by a management apparatus from an apparatus to be managed by a single message, the data is regarded as specified data. The apparatus to be managed divides the specified data into a set of pieces of divided data each having a data size equal to or smaller than the maximum data size and manages the set of pieces of divided data as management information using management apparatus.

When the specified data is required, the management apparatus sequentially obtains the management information corresponding to the set of pieces of divided data from the apparatus to be managed, then restores the specified data by combining the obtained management information through a specified data restoring unit and use the restored data.

The specified data may be image data of, for instance, the outline view of the apparatus to be managed.

In the network management system according to the present invention, large specified data (e.g. image data of an outline view) unable to be handled by a single message is stored in the apparatus to be managed as set of pieces of divided data. Thus, even when a new model apparatus to be managed which requires use of new specified data is connected to the network, it is possible to handle the new specified data, i.e. to display the outline view of the new model apparatus to be managed, without requiring any changes (e.g. version upgrade) to the management apparatus.

The above-mentioned management apparatus preferably manages the management information corresponding to the set of pieces of divided data such that the management information can be provided sequentially using GET_NEXT commands.

Specifically, the set of pieces of divided data are designed to constitute a table object as management information having a plurality of values identified by instance indexes.

In the case where the set of pieces of divided data are assigned to a table object as above, even if the amount of the specified data is changed, only the number of values which the table object has will be changed and the definition of the MIB will not be affected, while in the case where each of the set of pieces of divided data is assigned to each scalar object as management information having only a single value, if the amount of the specified data is changed, the number of pieces of management information may be increased/decreased, so that the definition of the MIB will have to be changed.

In the management apparatus according to the present invention, a divided data obtaining unit sequentially obtains the management information corresponding to the set of pieces of divided data from the apparatus to be managed, and a specified data restoring unit restores the specified data by combining the obtained management information.

It is preferable that the divided data obtaining unit is designed to sequentially obtain the management information corresponding to the set of pieces of divided data from the apparatus to be managed by using GET_NEXT commands repeatedly.

When using GET_NEXT commands as above, the divided data obtaining unit may determine whether or not to continue using the command based on the name for identifying the management information obtained along with the management information. When a GET_NEXT command indicating a name for identifying a piece of management information is used, the next piece of management information located next on the MIB tree showing the structure of the MIB is obtained along with its name for identifying the next piece of management information. Accordingly, it is possible to easily determine whether or not obtainment of the set of pieces of divided data has been completed by monitoring the name. Thus, the management apparatus can surely import the specified data even if the size of the specified data is not known previously.

When the management information corresponding to each of the set of pieces of divided data includes an end flag for indicating whether or not the piece of divided data is the last piece of the set of pieces of divided data, a divided data obtaining unit may determine whether or not to continue using the command according to the end flag included in the obtained management information.

Alternatively, when information about the data length of the specified data formed by combining the set of pieces of divided data is included in the head portion of the management information corresponding to the set of pieces of divided data, it may be determined whether or not to continue using the command based on the information about the data length.

In these cases, it is possible to omit to send GET_NEXT commands only to confirm whether or not the last piece of specified data has been obtained.

Each unit constituting the above described management apparatus may be configured as a program for making the computer operate.

In this case, the program is stored on a computer-readable storage medium such as an FD, MO, DVD, CD-ROM, hard disk, memory card, etc., and the stored program is used by being loaded in a computer system and started when necessary. Alternatively, it may be possible to store the program on a ROM or a backup RAM as the computer-readable storage medium and install the ROM or the RAM in the computer system for use. The program is not limited to one stored on such a storage medium, but may be used by being loaded through the network and started.

The network management system according to the present invention may comprise an apparatus to be managed connected to a network and including a first communication controller for controlling communications, a management information storage portion for dividing management information into a set of pieces of divided data having each data size able to be transmitted by a single message to the network and storing the divided management information therein, and a management information providing portion for obtaining the divided and stored management information and providing the management information to the first communication controller; and a management apparatus connected to a network and including a second communication controller for controlling communications, and a management information obtaining portion for sequentially obtaining the management information by transmitting a request to sequentially obtain the management information divided and stored in the management information storage portion of the apparatus to be managed to the second communication controller.

The network management system may comprise an apparatus to be managed connected to a network and including a first communication controller for controlling communications, a management information storage portion for dividing management information into a set of pieces of divided data having each data size able to be transmitted to the network and storing the divided management information therein, and a management information providing portion for obtaining the divided and stored management information and providing the management information to the first communication controller; and a management apparatus connected to a network and including a second communication controller for controlling communications, and a management information obtaining portion for sequentially obtaining the management information by transmitting a request to sequentially obtain the management information divided and stored in the management information storage portion of the apparatus to be managed to the second communication controller.

The network management system may comprise an apparatus to be managed connected to a network and including a first communication controller for controlling communications, a management information storage portion for continuously storing management information as data able to be transmitted to the network, and a management information providing portion for obtaining the continuously stored management information and providing the management information to the first communication controller; and a management apparatus connected to a network and including a second communication controller for controlling communications, and a management information obtaining portion for sequentially obtaining the management information by transmitting a request to sequentially obtain the management information continuously stored in the management information storage portion of the apparatus to be managed to the second communication controller.

The apparatus to be managed connected to a network may comprise a communication controller for communicating with the network by transmitting/receiving data to/from the network, a management information database for dividing management information data to be communicated using a network management protocol into a set of pieces of data having each data size able to be provided to the network and for storing the divided management information, and a management information providing unit for reading the pieces of data of management information and providing the management information to the communication controller in response to a request to provide management information received through the communication controller.

The apparatus to be managed connected to a network may comprise a communication controller for communicating with the network by transmitting/receiving data to/from the network, a management information database for dividing management information data to be communicated using a network management protocol into pieces of data having each data size able to be provided to the network and continuously storing the pieces of data, and a management information providing unit for sequentially reading the continuously stored pieces of data of management information and providing the management information to the communication controller in response to a request to provide management information received through the communication controller.

The management apparatus for obtaining management information from an apparatus to be managed, which divides management information into a set of pieces of divided data having each data size able to be transmitted to a network by a single message and stores the set of pieces of divided data, may comprise a divided data obtaining unit for sequentially obtaining the management information corresponding to the set of pieces of divided data from the apparatus to be managed, and a management information restoring unit for restoring the management information by combining the management information obtained by the divided data obtaining unit.

The program according to the present invention may be a program to make an apparatus to be managed perform the functions of being connected to a network and controlling communications, dividing management information into pieces of data having each data size able to be transmitted to the network by a single message and storing the divided data, and obtaining the divided and stored data and providing the management information to the network.

The program according to the present invention may be a program to make a management apparatus perform the functions of being connected to a network and controlling communications, transmitting a request to sequentially obtain the management information divided and stored in the apparatus to be managed to the network, and sequentially obtaining the divided and stored data from the apparatus to be managed.

The program according to the present invention may be a program to make an apparatus to be managed perform the functions of communicating with the network by transmitting/receiving data to/from the network, dividing management information data to be communicated using a simple network management protocol into a set of pieces of divided data having each data size able to be provided to the network and storing the divided data of management information, reading the divided data of management information in response to a request to provide management information received through the network, and providing the management information to the network.

The program according to the present invention may be a program to make an apparatus to be managed perform the functions of dividing specified data, among data to be managed as management information, having a data size larger than a maximum data size able to be provided to the management apparatus by a single message into a set of pieces of divided data each having a data size equal to or smaller than the maximum data size, and managing the set of pieces of divided data as the management information.

BRIEF DESCRIPTION OF THE DRAWINGS

A preferred embodiment according to the present invention will now be described with reference to the drawings in which:

FIG. 3 is an explanatory view illustrating the configuration of an MIB tree dictionary;

DETAILED DESCRIPTION OF A PREFERRED EMBODIMENT

Figure 1:
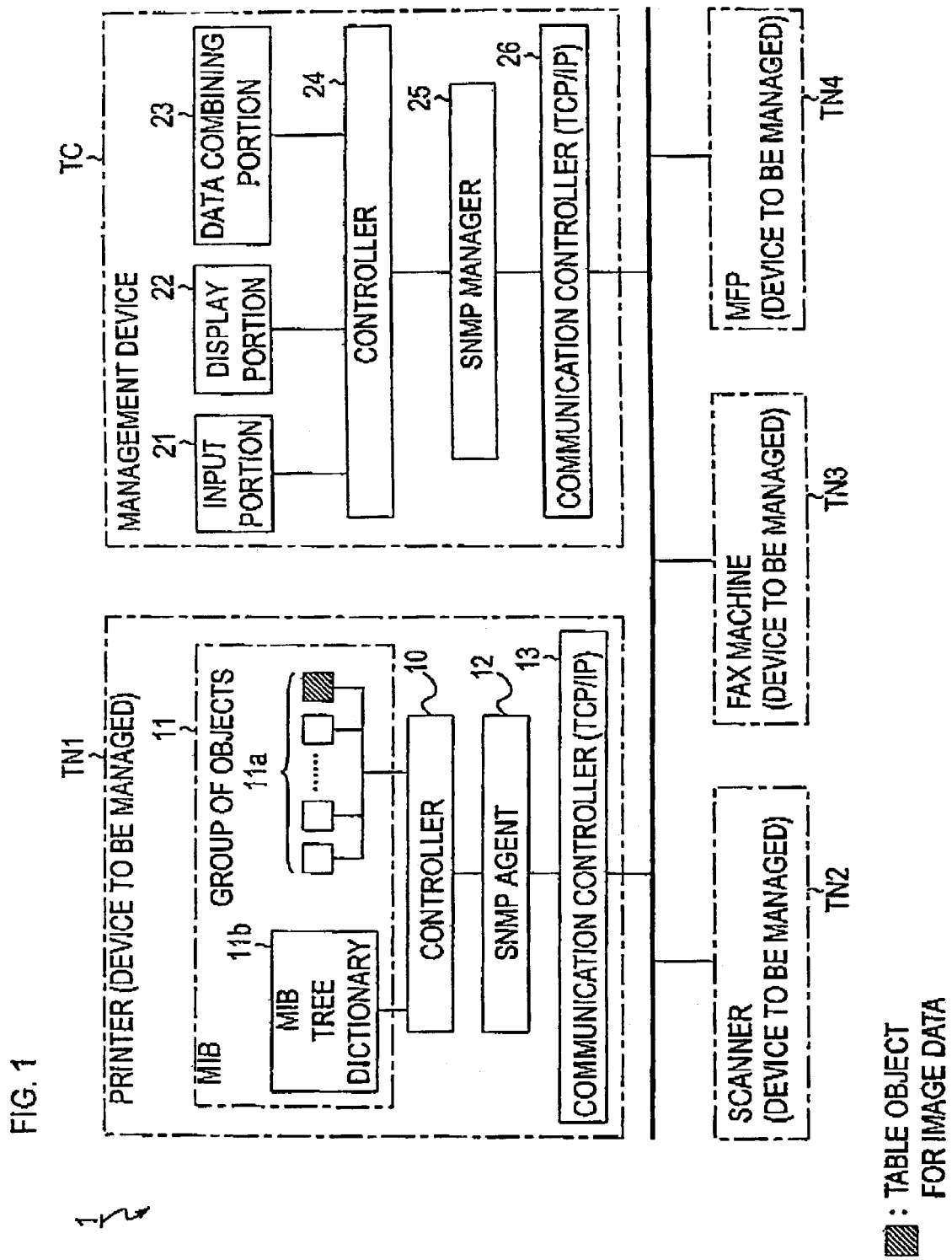
FIG. 1 is a block diagram illustrating the software structure of a network management system of the present embodiment.

FIG. 1 shows the structure of a network management system 1 according to the present invention.

In the network management system 1, as shown in FIG. 1, apparatuses to be managed TNi (i=1-4) including a printer, a scanner, a fax machine and an MFP as well as a management apparatus TC comprising a personal computer for centralized management of these apparatuses to be managed are connected to a network using UDP/IP protocol.

In the apparatus to be managed TNi (i=1-4), a Management Information Base (MIB) 11 (i.e. management unit) comprising a group of objects 11a which are a group of management information (objects) about the apparatus to be managed TNi and an MIB tree dictionary 11b which is information for specifying the management information, a communication controller 13 for controlling communications in accordance with UDP/IP protocol, an SNMP agent 12 which is a program for performing the process of reading and updating the information in the MIB 11 in accordance with a request message (GET command, GET_NEXT command, SET command) received from the management apparatus TC through the communication controller 13, and of transmitting a reply message (GETREPLY) and the like to the management apparatus TC through the communication controller 13, and a controller 10 for transmitting a reply message to the management apparatus TC using the SNMP agent 12 are packaged.

The group of objects 11a include at least an object containing image data for indicating the outline view of the apparatus to be managed itself. The object comprises a table object having a plurality of values to be identified by instance indexes.

Figures 2A, 2B:
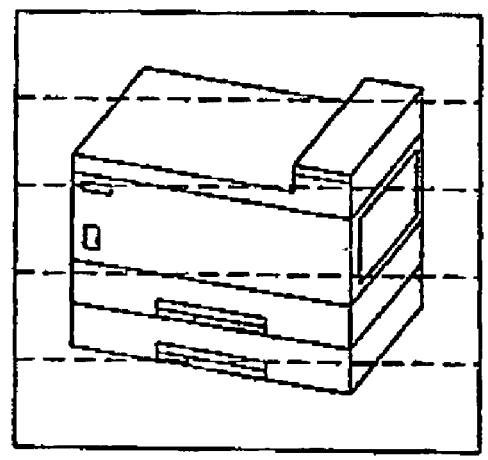
FIGS. 2A and 2B are explanatory views illustrating the correspondence between pieces of divided data obtained by dividing image data for showing an outline view and a table object.

In the present embodiment, the maximum value of the size of data able to be transmitted/received by a single SNMP message is limited to 255 bytes, and the image date of the outline view is divided into five pieces of data as shown in FIG. 2A.

Respective pieces of divided data (hereinafter referred to as the divided data), as shown in FIG. 2B, are specified by respective names of "1.3.6.1.4.1.2435.2.4.3.99.1" through "1.3.6.1.4.1.2435.2.4.3.99.5" created by combining a prefix of "1.3.6.1.4.1.2435.2.4.3.99" for specifying the table object and instance indexes (or suffixes) of 1 through 5 corresponding respectively to the pieces of divided data.

Specifically, as shown in FIG. 3, information for specifying the management information, such as "1.3.6.1.4.1.2435.2.4.3.98.0," followed by "1.3.6.1.4.1.2435.2.4.3.99.1," further followed by "1.3.6.1.4.1.2435.2.4.3.99.2," is stored sequentially in the MIB tree dictionary 11b.

Figure 4A:
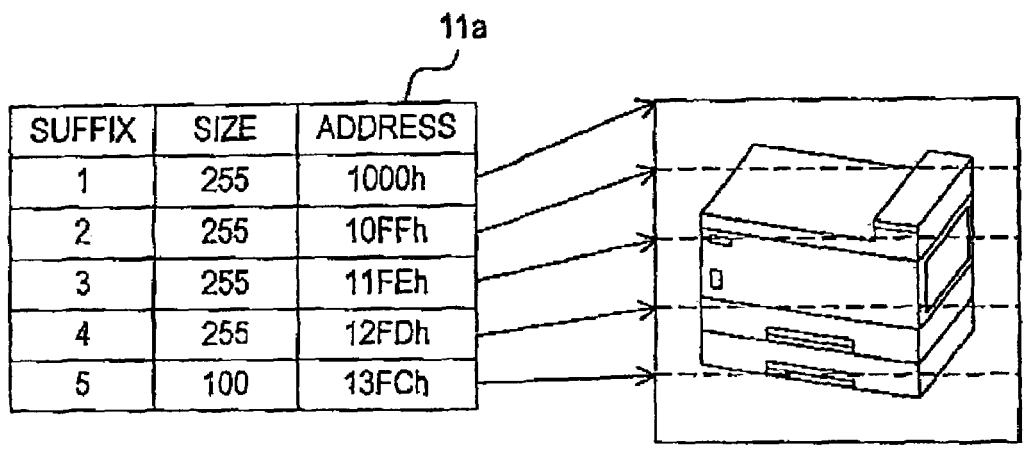
FIGS. 4A and 4B are explanatory views illustrating the configuration of divided data stored as a group of objects.

In the MIB 11, the divided data as above is stored as a group of objects 11a, as shown in FIG. 4A. Respective pieces of divided data are assigned the above-mentioned suffixes of 1 through 5 as identifiers, and the addresses of the respective pieces of divided data (i.e. storage addresses) are continuous.

For example, the piece of divided data assigned suffix "1" is stored at the address of 1000h-10FEh, and the piece of divided data assigned suffix "2" is stored at the following address of 10FFh-10Dh.

When the divided data specified by the prefix "1.3.6.1.4.1.2435.2.4.3.99" is transmitted to the management apparatus TC, the object in which the divided data to be transmitted is stored is specified by the part "99" in "1.3.6.1.4.1.2435.2.4.3.99," with reference to the SNMP agent 12 and then the respective pieces of divided data are transmitted sequentially.

Figure 4B:
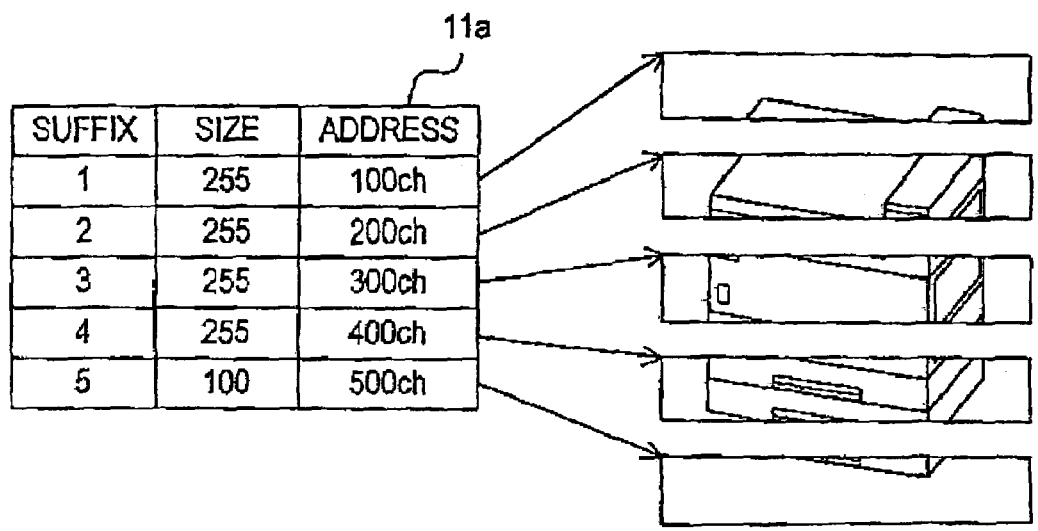

Alternatively, as shown in FIG. 4B, the addresses of the respective pieces of divided data may be discontinuous. For example, the piece of divided data assigned suffix "1" is stored at the address of 1000h-10FEh, while the piece of divided data assigned suffix "2" is stored at the separate address of 2000h-20FEh.

In the management apparatus TC, an input portion 21 for inputting instructions from an operator, a display portion 22 for displaying a variety of information, a data combining portion 23 for combining image data to be used when the outline view of the apparatus to be managed TNi is displayed on the display portion 22, a communication controller 26 for controlling communications in accordance with UDP/IP protocol, an SNMP manager 25 which is a program for obtaining and setting management information using the SNMP agent 12 packaged in the apparatus to be managed TNi, and a controller 24 for performing, in accordance with the instructions input through the input portion 21, the process of, for instance, displaying the variety of information obtained from the apparatus to be managed TNi using the SNMP manager 25 on the display portion 22 are packaged.

In the network management system 1 constructed as above, when the management apparatus TC is started, a list of the apparatuses to be managed TNi which are connected to the network is displayed on the display portion 22 in the same manner as in the conventional system 100. When one of the apparatuses is selected in accordance with the instruction from the input portion 21, the indication on the display portion 22 is switched to a management screen with respect to the selected apparatus to be managed TNi, and then it becomes possible to confirm or change the operating state or the setting state of the apparatus to be managed TNi on the management screen.

In the network management system 1 of the present embodiment, image data for indicating the outline view as well as other management information is obtained from the apparatus to be managed TNi, unlike the case of the conventional system 100.

Figure 5:
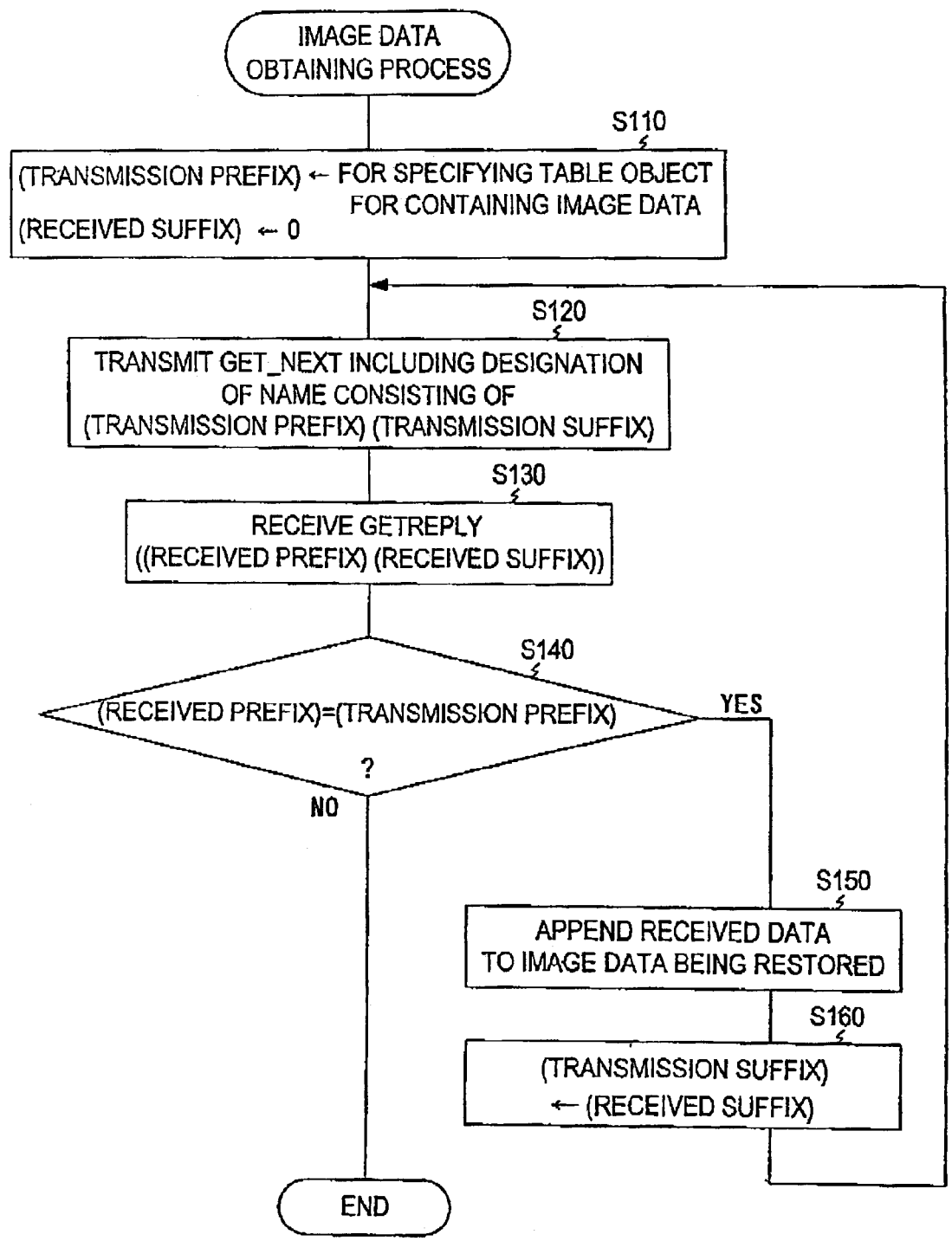
FIG. 5 is a flow chart illustrating the process of obtaining image data.
Figure 6:
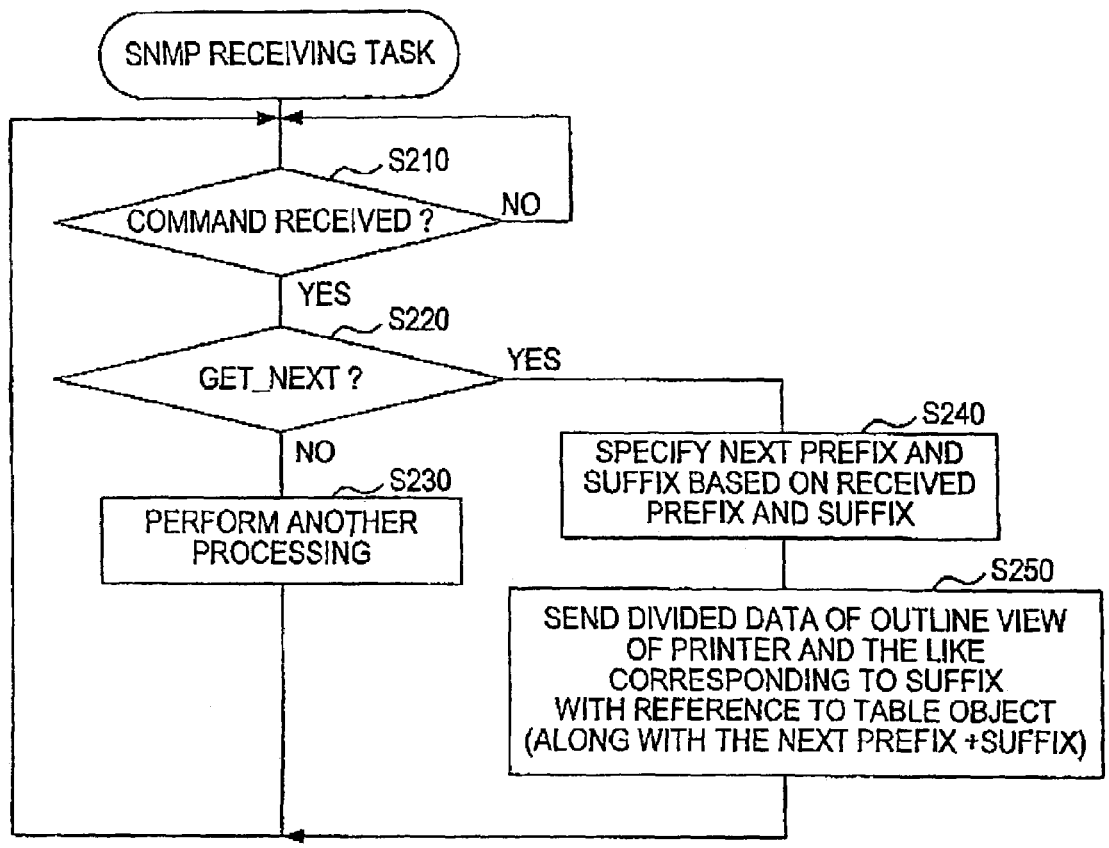
FIG. 6 is a flowchart illustrating the process of performing an SNMP receiving task.
Figure 7:
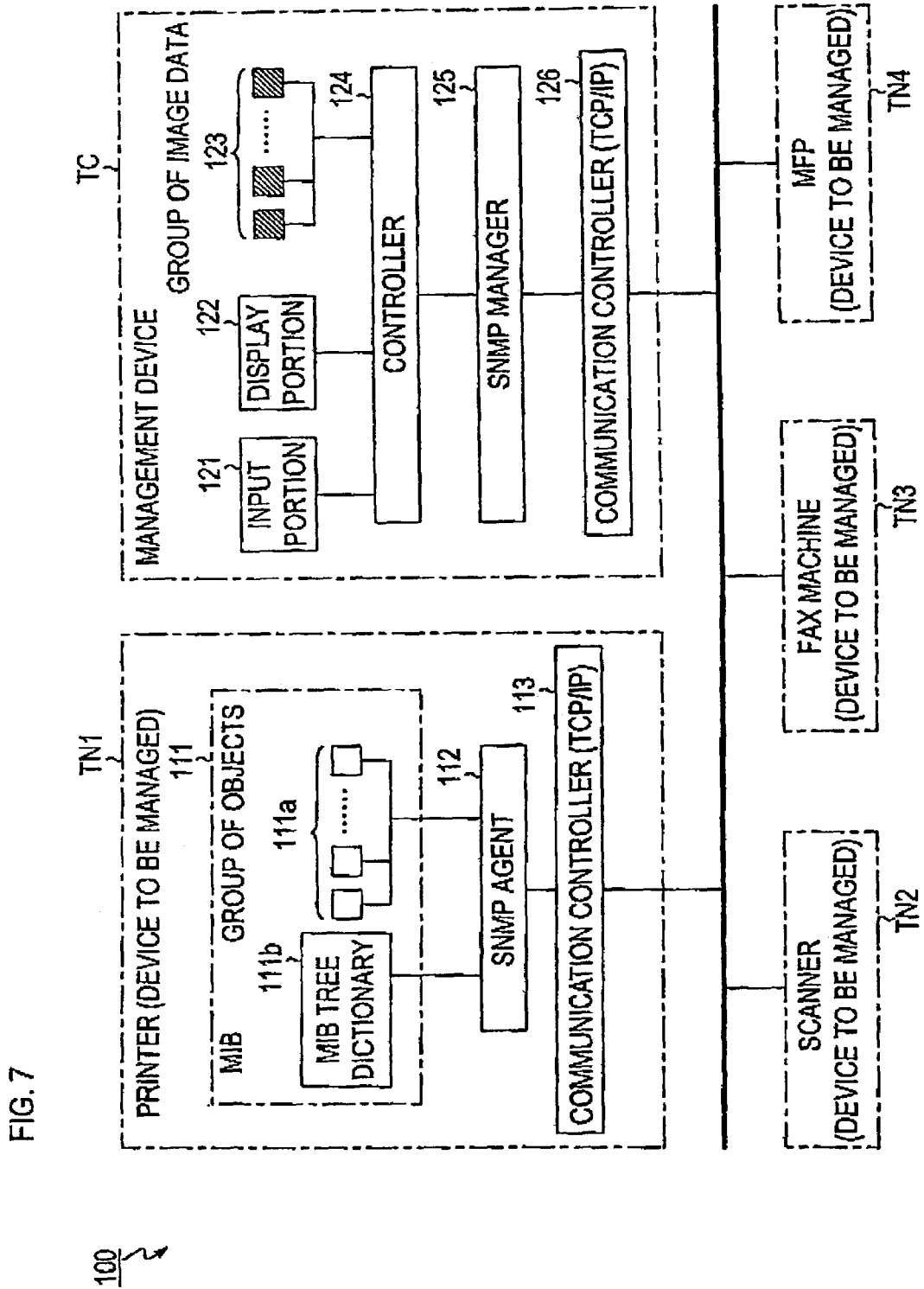
FIG. 7 is a block diagram illustrating the software structure of a conventional network management system.
Figure 8:
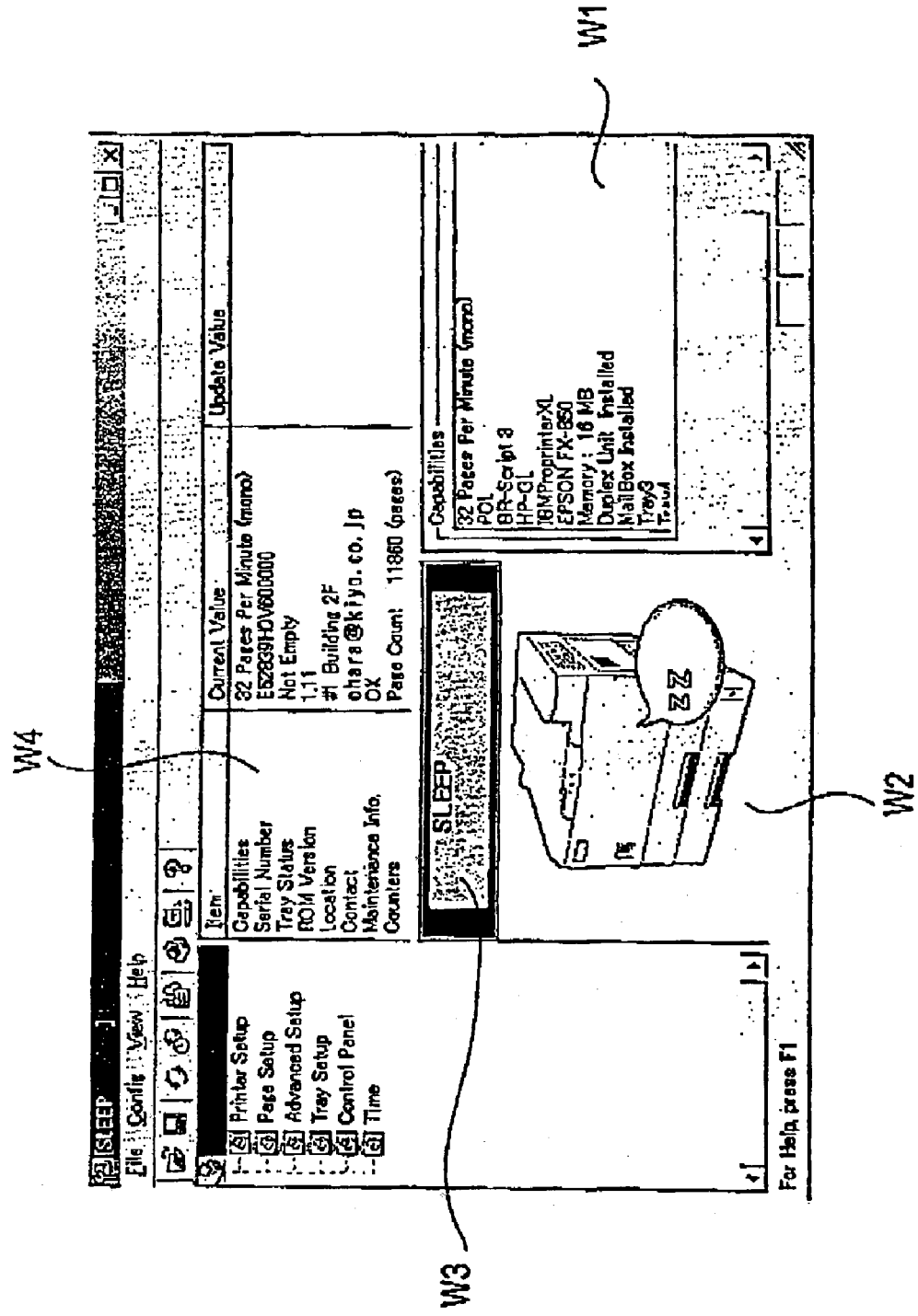
FIG. 8 is a view showing an example of a management screen used in the network management system of the present invention.

The image data obtaining process performed by the controller 24 of the management apparatus TC to obtain the image data will now be described with reference to the flowchart of FIG. 5. The process of performing an SNMP receiving task (FIG. 6) by the controller 10 of the apparatus to be managed TNi in parallel to the image data obtaining process will also be described.

When the image data obtaining process is started, first in S110 the transmission prefix is set to a value of "1.3.6.1.4.1.2435.2.4.3.99" for identifying the table object containing the image data, while the transmission suffix (instance index) is set to "0". Subsequently, in S120, a GET_NEXT command including designation of the name consisting of the transmission prefix and the transmission suffix added to the end thereof is transmitted.

On the other hand, the controller 10 for performing the process of controlling an SNMP receiving task determines in S210 whether or not a command is received from the controller 24. When it is determined that a command is received (S210: YES), process proceeds to S220, where it is determined whether or not the received command is a GET_NEXT command.

When it is determined that the received command is not a GET_NEXT command (S220: NO), process proceeds to S230. In S230, another processing corresponding to the received command (e.g. setting of the management information on the resolution of the printer) is performed, and then process returns to S210.

When it is determined that the received command is a GET_NEXT command (S220: YES), process proceeds to S240.

In S240, the name located next on the MIB tree to the name (prefix+suffix) designated by the GET_NEXT command is specified with reference to the MIB tree dictionary 11b.

In S250, the data corresponding to the suffix specified in S240 (e.g. divided data of the outline view of the printer) is specified with reference to the table object specified by the prefix specified in S240. Then, the data along with the name (prefix+suffix) corresponding to the data is returned by GETREPLY, and process returns to S210. In the controller 10 of the apparatus to be managed TNi, the process from S220 to S250 is preformed every time a command is received from the controller 24.

When GETREPLY is returned in S250, the controller 24 of the management apparatus TC receives the GETREPLY returned from the apparatus to be managed TNi in S130.

In S140, it is determined whether or not the prefix (hereinafter referred to as "received prefix") of the name indicated by the GETREPLY is identical with the transmission prefix designated by the GET_NEXT command transmitted in the previous S120. If it is determined identical, the process step proceeds to S150, in which the data received with GETREPLY is added to the image data being formed in the data combining portion 23.

In S160, the suffix of the name indicated by the GETREPLY (hereinafter referred to as "received suffix") is set as a new transmission suffix, then the process step returns to S120 and the same operation is repeatedly performed.

On the other hand, if it is determined in S140 that the received prefix is different from the transmission prefix, the present process is terminated without adding the data received with GETREPLY to the image data being formed in the data combining portion 23, on the assumption that the data of the table object specified by the initially designated transmission prefix has all been received.

Specifically, by performing the above described process, the pieces of divided data contained in the table object which is identified by the prefix of "1.3.6.1.4.1.2435.2.4.3.99," for instance, are obtained by transmitting GET_NEXT commands six times which is one more than the number of the pieces of divided data, as described below.

[The First Time]
    GET_NEXT 1.3.6.1.4.1.2435.2.4.3.99.0
    GETREPLY (Type: String Type) (Length: 255 bytes)
        1.3.6.1.4.1.2435.2.4.3.99.1 (Divided Data (1/5))

[The Second Time]
    $GET_{13}$ NEXT 1.3.6.1.4.1.2435.2.4.3.99.1
    GETREPLY (Type: String Type) (Length: 255 bytes)
        1.3.6.1.4.1.2435.2.4.3.99.2 (Divided Data (2/5))

[The Third Time]
    GET_NEXT 1.3.6.1.4.1.2435.2.4.3.99.2
    GETREPLY (Type: String Type) (Length: 255 bytes)
        1.3.6.1.4.1.2435.2.4.3.99.3 (Divided Data (3/5))

[The Fourth Time]
    GET_NEXT 1.3.6.1.4.1.2435.2.4.3.99.3
    GETREPLY (Type: String Type) (Length: 255 bytes)
        1.3.6.1.4.1.2435.2.4.3.99.4 (Divided Data (4/5))

[The Fifth Time]
    GET_NEXT 1.3.6.1.4.1.2435.2.4.3.99.4
    GETREPLY (Type: String Type) (Length: 104 bytes)
        1.3.6.1.4.1.2435.2.4.3.99.5 (Divided Data (5/5))

[The Sixth Time]
    GET_NEXT 1.3.6.1.4.1.2435.2.4.3.99.5
    GETREPLY (Type: String Type) (Length: 255 bytes)
        1.3.6.1.4.1.2435.2.4.3.100.1 (Next Data)

In this case, it is determined that the data obtained by transmission of the sixth $GET_{13}$ NEXT command belongs to the next object from the prefix of the name indicated by the GETREPLY, i.e. "1.3.6.1.4.1.2435.2.4.3.100" (≠"1.3.6.1.4.1.2435.2.4.3.99"), and thus transmission of the GET_NEXT command is stopped at this point in time. Then, image data is restored in the data combining portion 23 using the pieces of divided data obtained by the first through the fifth transmission of GET_NEXT commands, and the outline view W2 is displayed on the management screen using the restored image data.

As described above, in the network management system 1 of the present embodiment, an original image data with respect to an outline view having a data size exceeding the maximum size of data able to be transmitted/received by a single message is divided into a plurality of pieces of divided data and stored in the apparatus to be managed TNi, and the management apparatus TC restores the original image data by obtaining the pieces of divided data sequentially and combining the same.

Thus, according to the network management system 1 of the present embodiment, the storage capacity of the management apparatus TC can be reduced since the management apparatus TC is not required to have the image data for displaying the respective outline views of the apparatuses to be managed TNi. When a new model apparatus to be managed TNi is connected to the network, it is possible to obtain the outline view of the new model apparatus to be managed TNi from the apparatus to be managed TNi and display the same without making any changes (e.g. version upgrade of its management software) to the management apparatus TC.

Moreover, in the present embodiment in which the pieces of divided data are stored as a table object in the apparatus to be managed TNi, even if the number of pieces of divided data differs depending on each model, it is not the definition of the MIB but merely the number of instance indexes of the table object that will be changed.

In the present embodiment, each value of the table object is obtained using a GET_NEXT command, and the number of using GET_NEXT commands is controlled on the basis of the name for identifying the object to be obtained along with the value. Therefore, all necessary pieces of divided data can surely be obtained even though the management apparatus TC does not know the number of pieces of divided data in advance.

While specified data having a data size exceeding the maximum size of data able to be transmitted/received by a single message is image data for displaying an outline view in the present embodiment, the present invention may be applied to any kind of data having the above-mentioned data size.

While it is determined whether or not to continue obtaining a piece of divided data by comparing the prefixes of the name for identifying the object in the present embodiment, it may also be possible to include an end flag, in each piece of divided data, indicating whether or not the each piece of divided data is the last piece of divided data, thereby to determine whether or not to continue obtaining the piece of divided data according to the end flag. Alternatively, it may be possible to include, in the first piece of divided data, restored data information about the length of the original specified data when restored from all the pieces of divided data, thereby to determine whether or not to continue obtaining the piece of divided data based on the restored data information.

Furthermore, while all the pieces of divided data are obtained using GET_NEXT commands in the present embodiment, it may be possible to obtain only the first piece of divided data or all of the pieces of data using GET commands in the case where the value used for the suffix is previously fixed.

While the present invention is applied to a network using UDP/IP in the above described embodiment, it may be applied to a network using one of other communication protocols such as TCP/IP.

What is claimed is:

1. A network management system, comprising:
an apparatus to be managed connected to a network and including:
a first communication controller for controlling communications,
a management information storage portion for dividing management information into a set of pieces of divided data having each data size able to be transmitted by a single message to the network and storing the divided management information therein, and
a management information providing portion for obtaining the divided and stored management information and providing the management information to the first communication controller; and
a management apparatus connected to a network and including:
a second communication controller for controlling communications, and
a management information requesting portion for transmitting each of a series of sequential requests to sequentially obtain each of the divided management information stored in the management information storage portion of the apparatus to be managed to the second communication controller, and a management information obtaining portion for sequentially obtaining each individual piece of divided data of the divided management information corresponding to each of the series of sequential requests performed by the management information requesting portion.

2. The network management system as set forth in claim 1, wherein when the management information is specified data having a data size larger than a maximum size of data able to be transmitted to the network by a single message, the management information storage portion of the apparatus to be managed divides the specified data and stores the divided specified data.

3. The network management system as set forth in claim 2, wherein the management apparatus further comprises a specified data restoring unit for restoring the specified data, when the specified data is required, by sequentially obtaining the management information corresponding to the set of pieces of divided data from the apparatus to be managed, and by combining the obtained management information.

4. The network management system as set forth in claim 2, wherein the specified data is image data.

5. The network management system as set forth in claim 4, wherein the image data is the outline view of the apparatus to be managed.

6. The network management system as set forth in claim 1, wherein the management information storage portion of the apparatus to be managed stores management information to be provided to the first communication controller using a network management protocol.

7. The network management system as set forth in claim 6, wherein the data size able to be transmitted by a single message to the network is determined by the network management protocol.

8. The network management system as set forth in claim 6, wherein the network management protocol is Simple Network Management Protocol (SNMP), wherein the management information providing portion includes an SNMP agent, and wherein the management information obtaining portion includes an SNMP manager.

9. The network management system as set forth in claim 1, wherein the management information storage portion of the apparatus to be managed has a Management Information Base (MIB) including a group of objects which are actual data of management information and object identifiers for identifying each object.

10. The network management system as set forth in claim 9, wherein the group of objects constitute management information with a table structure.

11. The network management system as set forth in claim 9, wherein each object of the group of objects has a table structure comprising a plurality of divided information, wherein the management information storage portion includes identification data for identifying the management information of the group of objects and suffixes indicating positional information about respective tables of the plurality of divided information.

12. The network management system as set forth in claim 11, wherein the positional information comprises indexes.

13. The apparatus to be managed as set forth in claim 11, wherein the management information storage portion continuously stores the management information, wherein the request to obtain the management information by the management information obtaining portion is a GET_NEXT command, and wherein the management information providing portion provides divided information identified by the suffix next to the suffix indicating positional information of a table specified by the GET_NEXT command, to the communication controllers.

14. The network management system as set forth in claim 1, wherein the management information storage portion contains information with a tree structure.

15. The network management system as set forth in claim 1, wherein the management information storage portion continuously stores the management information, wherein the request to sequentially obtain the management information by the management information obtaining portion is a GET_NEXT command, and wherein the management information obtaining portion obtains management information, which is stored next to the management information specified by the GET_NEXT command in the management information storage portion, through the communication controllers.

16. The network management system as set forth in claim 1, wherein the management information storage portion of apparatus to be managed stores the each part of management information as each part of a set of continuous pieces of data having each data size able to be transmitted to the network in response to the request from the management information obtaining portion of the management apparatus.

17. The network management system as set forth in claim 16, wherein the management information storage portion of apparatus to be managed stores the each part of management information to be provided to the first communication controller using Simple Network Management Protocol (SNMP) on the network.

18. The network management system as set forth in claim 1, wherein the maximum size of data able to be transmitted to the network is 255 bytes.

19. A network management system wherein a management apparatus collects management information stored by an apparatus to be managed, the apparatus to be managed comprising a management unit for dividing specified data, among data to be managed as the management information, having a data size larger than a maximum data size able to be obtained by the management apparatus by a single message into a set of pieces of divided data each having a data size equal to or smaller than the maximum data size, and for managing the set of pieces of divided data as the management information, and the management apparatus comprising:

a requesting unit for sequentially transmitting each of a series of requests to sequentially obtain the management information corresponding to each individual piece of divided data of the set of pieces of divided data from the apparatus to be managed, and a specified data restoring unit for restoring the specified data, when the specified data is required, by combining the obtained management information corresponding to the series of requests performed by the requesting unit.

20. The network management system as set forth in claim 19, wherein the specified data is image data.

21. The network management system as set forth in claim 20, wherein the image data is the outline view of the apparatus to be managed.

22. An apparatus to be managed connected to a network, comprising:

a communication controller for communicating with the network by transmitting/receiving data to/from the network, a management information database for dividing management information data to be communicated using a network management protocol into a set of pieces of data having each data size able to be provided by a single message to the network and for storing the divided management information, and a management information providing unit for reading the pieces of data of management information and providing each individual piece of data of the pieces of data of the management information to the communication controller in response to each of a series of sequential requests to provide each individual piece of data of the pieces of data of the management information received through the communication controller.

23. The apparatus to be managed as set forth in claim 22, wherein the network management protocol is Simple Network Management Protocol (SNMP), and wherein the management information providing unit includes an SNMP agent.

24. The apparatus to be managed as set forth in claim 23, wherein the maximum data size of management information able to be transmitted to the network by means of the SNMP is 255 bytes.

25. The apparatus to be managed as set forth in claim 22, wherein the management information database has a Management Information Base (MIB) including a group of objects as a set of management information and an MIB tree dictionary which is information for specifying the management information.

26. The apparatus to be managed as set forth in claim 25, wherein the group of objects constitute management information with a table structure.

27. The apparatus to be managed as set forth in claim 22, wherein the management information database has a tree structure.

28. The apparatus to be managed as set forth in claim 27, wherein each object of the group of objects has a table structure comprising a plurality of divided information, and wherein the management information database contains identification data for identifying the management information of the group of objects and suffixes indicating positional information about respective tables of the plurality of divided information.

29. The apparatus to be managed as set forth in claim 28, wherein the positional information comprises indexes.

30. The apparatus to be managed as set forth in claim 28, wherein the management information database continuously stores the management information, wherein the request to provide management information is a GET_NEXT command, and wherein the management information providing unit provides divided information identified by the suffix next to the suffix indicating positional information of a table specified by the GET_NEXT command, to the communication controllers.

31. The apparatus to be managed as set forth in claim 22, wherein the management information database continuously stores the management information, wherein the request to provide management information is a GET_NEXT command, and wherein the management information providing unit provides management information, which is stored next to the management information specified by the GET_NEXT command in the management information database, to the communication controllers.

32. The apparatus to be managed as set forth in claim 22, wherein the management information is image data.

33. The apparatus to be managed as set forth in claim 32, wherein the image data is the outline view of the apparatus to be managed.

34. The apparatus to be managed as set forth in claim 22, wherein the apparatus to be managed is a printer.

35. The apparatus to be managed as set forth in claim 22, wherein the apparatus to be managed is a scanner.

36. The apparatus to be managed as set forth in claim 22, wherein the apparatus to be managed is a fax machine.

37. The apparatus to be managed as set forth in claim 22, wherein the apparatus to be managed is a multifunction product.

38. An apparatus to be managed connected to a network, comprising:

a communication controller for communicating with the network by transmitting/receiving data to/from the network, a management information database for dividing management information data to be communicated using a network management protocol into pieces of data having each data size able to be provided to the network by a single message and continuously storing the pieces of data, and a management information providing unit for sequentially reading the continuously stored pieces of data of management information and providing each individual piece of data of the pieces of data of management information to the communication controller in response to each of a series of sequential requests to provide each individual piece of data of the pieces of data of management information received through the communication controller.

39. The apparatus to be managed as set forth in claim 38, wherein the management information database stores the management information as a set of continuous pieces of data having each data size able to be transmitted to the network in response to the request from the management information obtaining portion of the management apparatus.

40. The apparatus to be managed as set forth in claim 39, wherein the management information database stores the management information to be provided to the communication controller using Simple Network Management Protocol (SNMP) on the network.

41. The apparatus to be managed as set forth in claim 40, wherein the maximum size of data able to be transmitted to the network is 255 bytes.

42. An apparatus to be managed for providing management information in response to a request from a management apparatus, the apparatus to be managed comprising:

a management unit for dividing specified data, among data to be managed as the management information, having a data size larger than a maximum data size able to be provided to the management apparatus by a single message into a set of pieces of divided data each having a data size equal to or smaller than the maximum data size, and for managing the set of pieces of divided data as the management information, and providing each individual piece of data of the set of pieces when requested by each of a series of sequential requests from the management apparatus.

43. The apparatus to be managed as set forth in claim 42, further comprising:

a management information providing unit for providing management information on a management information database (MIB) in response to a request from a management apparatus in accordance with a Simple Network Management Protocol (SNMP), wherein the management unit manages so as to enable the management information providing unit to continuously provide management information corresponding to the set of pieces of divided data using GET_NEXT commands.

44. The apparatus to be managed as set forth in claim 43, wherein the set of pieces of divided data constitute a table object which is management information having a plurality of values to be identified by instance indexes.

45. The management apparatus for obtaining the management information from the apparatus to be managed as set forth in claim 44, wherein the management apparatus comprises:
- a divided data obtaining unit for sequentially obtaining the management information corresponding to the set of pieces of divided data from the apparatus to be managed, and
- a specified data restoring unit for restoring the specified data by combining the management information obtained by a divided data obtaining unit.

46. The management apparatus for obtaining the management information from the apparatus to be managed as set forth in claim 44, wherein the management apparatus comprises:
- a divided data obtaining unit for sequentially obtaining the management information corresponding to the set of pieces of divided data from the apparatus to be managed by repeatedly using GET_NEXT commands, and
- a specified data restoring unit for restoring the specified data by combining the management information obtained by the divided data obtaining unit.

47. The management apparatus as set forth in claim 46, wherein the divided data obtaining unit determines whether or not to continue using the command based on the name for identifying the management information obtained along with the management information.

48. The management apparatus as set forth in claim 47, wherein the management information corresponding to the set of pieces of divided data includes an end flag for indicating whether or not a piece of divided data is the last piece of the set of pieces of divided data, and wherein the divided data obtaining unit determines whether or not to continue using the command according to the end flag included in the obtained management information.

49. The management apparatus for obtaining the management information from the apparatus to be managed as set forth in claim 43, wherein the management apparatus comprises:
- a divided data obtaining unit for sequentially obtaining the management information corresponding to the set of pieces of divided data from the apparatus to be managed, and
- a specified data restoring unit for restoring the specified data by combining the management information obtained by the divided data obtaining unit.

50. The management apparatus for obtaining the management information from the apparatus to be managed as set forth in claim 43, wherein the management apparatus comprises:
- a divided data obtaining unit for sequentially obtaining the management information corresponding to the set of pieces of divided data from the apparatus to be managed by repeatedly using GET_NEXT commands, and
- a specified data restoring unit for restoring the specified data by combining the management information obtained by the divided data obtaining unit.

51. The management apparatus as set forth in claim 50, wherein the divided data obtaining unit determines whether or not to continue using the command based on the name for identifying the management information obtained along with the management information.

52. The management apparatus as set forth in claim 51, wherein the management information corresponding to the set of pieces of divided data includes an end flag for indicating whether or not a piece of divided data is the last piece of the set of pieces of divided data, and wherein the divided data obtaining unit determines whether or not to continue using the command according to the end flag included in the obtained management information.

53. The management apparatus for obtaining the management information from the apparatus to be managed as set forth in claim 42, wherein the management apparatus comprises:
- a divided data obtaining unit for sequentially obtaining the management information corresponding to the set of pieces of divided data from the apparatus to be managed, and
- a specified data restoring unit for restoring the specified data by combining the management information obtained by the divided data obtaining unit.

54. A management apparatus for obtaining management information from an apparatus to be managed which divides management information into a set of pieces of divided data having each data size able to be transmitted to a network by a single message and stores the set of pieces of divided data, the management apparatus comprising:
- a divided data requesting unit for sequentially transmitting each of a series of requests to obtain each individual piece of data of the set of pieces of divided data,
- a divided data obtaining unit for sequentially obtaining the management information corresponding to the set of pieces of divided data from the apparatus to be managed, and
- a management information restoring unit for restoring the management information by combining the management information obtained by the divided data obtaining unit.

55. The management apparatus as set forth in claim 54, wherein when the management information is specified data having a data size larger than a maximum size of data able to be transmitted to the network by a single message, the apparatus to be managed divides the specified data and stores the divided specified data, and wherein the management information restoring unit restores the specified data.

56. The management apparatus as set forth in claim 55, wherein the apparatus to be managed stores the management information using a Simple Network Management Protocol (SNMP), and wherein the management apparatus comprises:
- a divided data obtaining unit for sequentially obtaining the management information corresponding to the set of pieces of divided data from the apparatus to be managed by repeatedly using GET_NEXT commands, and
- a specified data restoring unit for restoring the specified data by combining the management information obtained by the divided data obtaining unit.

57. The management apparatus as set forth in claim 56, wherein the divided data obtaining unit determines whether or not to continue using the command based on the name for identifying the management information obtained along with the management information.

58. The management apparatus as set forth in claim 56, wherein the management information corresponding to the set of pieces of divided data includes an end flag for indicating whether or not a piece of divided data is the last piece of the set of pieces of divided data, and wherein the divided data obtaining unit determines whether or not to continue using the command according to the end flag included in the obtained management information.

59. A computer-readable storage medium that stores a program to make an apparatus to be managed perform the functions of:

being connected to a network and controlling communications, dividing management information into pieces of data having each data size able to be transmitted to the network by a single message and storing the divided data, and obtaining the divided and stored data and providing each individual piece of data of the pieces of data to the network in response to a management apparatus that sequentially transmits each of a series of requests that correspond to each of the pieces of data.

60. A computer-readable storage medium that stores a program to make a management apparatus perform the functions of:

being connected to a network and controlling communications, transmitting each of a series of sequential requests to sequentially obtain each of individual pieces of divided management information stored in the apparatus to be managed, which divides management information into pieces of divided data having each data size able to be transmitted to a network by a single message, to the network, and sequentially obtaining the each of individual pieces of divided management information from the apparatus to be managed.

61. A computer-readable storage medium that stores a program to make an apparatus to be managed perform the functions of:

communicating with the network by transmitting/receiving data to/from the network, dividing management information data to be communicated using a simple network management protocol into a set of pieces of divided data having each data size able to be provided to the network by a single message and storing the divided data of management information, reading each individual piece of the divided data of management information in response to each of a series of sequential requests to provide management information received through the network, and providing each individual piece of the divided data of management information to the network.

62. A computer-readable storage medium that stores a program to make an apparatus to be managed perform the functions of:

dividing specified data, among data to be managed as management information, having a data size larger than a maximum data size able to be provided to the management apparatus by a single message into a set of pieces of divided data each having a data size equal to or smaller than the maximum data size, and managing the set of pieces of divided data as the management information and sequentially transmitting each individual piece of the divided data in response to each of a series of sequentially received requests.

* * * * *